United States Patent [19]

Guttinger et al.

[11] Patent Number: 5,261,522
[45] Date of Patent: Nov. 16, 1993

[54] POUCH DELIVERY SYSTEM

[75] Inventors: Peter Guttinger, Milton; H. J. Paul Langen; Mirek Tokarz, both of Brampton, all of Canada

[73] Assignee: H.J. Langen & Sons Inc., Mississauga, Canada

[21] Appl. No.: 757,672

[22] Filed: Sep. 10, 1991

[51] Int. Cl.$^5$ ............................................. B65G 25/00
[52] U.S. Cl. .................................. 198/429; 198/430; 198/468.1; 414/790.3; 414/791; 414/794.7
[58] Field of Search ............... 198/343.1, 429, 430, 198/418.4, 468.1, 484.1, 740, 803.13, 4431; 414/790.3, 791, 793.5, 793.6, 794.7

[56] References Cited

U.S. PATENT DOCUMENTS

| | | | |
|---|---|---|---|
| 2,644,473 | 7/1953 | Fox et al. | 198/803.13 X |
| 3,995,748 | 12/1976 | Looney | 414/791 X |
| 4,180,154 | 12/1979 | Andersson | 198/431 X |
| 4,325,475 | 4/1982 | Spalding | 198/429 |
| 4,394,899 | 7/1983 | Fluck | 198/468.1 X |
| 4,399,905 | 8/1983 | Lance et al. | 198/430 |
| 4,802,570 | 2/1989 | Hirsch et al. | 198/430 X |
| 5,018,334 | 5/1991 | Guttinger et al. | 198/429 X |

FOREIGN PATENT DOCUMENTS 0250190 12/1987 European Pat. Off.
1530981 11/1978 United Kingdom.
2124574 2/1984 United Kingdom.

Primary Examiner—Joseph E. Valenza
Assistant Examiner—Tuan N. Nguyen

[57] ABSTRACT

There is shown an endless conveyor having a loading station and an unloading station. Articles, such as pouches are loaded individually onto platters on an endless chain by a walking beam type device. Each platter on the chain co-operates with the next adjacent platter to form article receiving pockets and each platter has a plurality of slots aligned with the plurality of slots in the next adjacent platter. Articles are driven up an inclined ramp by a delivery conveyor to a loading platform. From the loading platform the articles are loaded onto the endless chain conveyor by the loading walking beam device. Articles are discharged from the endless chain conveyor at an unloading station where a series of platters pass through a vertical run of the chain onto upstanding rods which are inserted into the rear of the slots and then, whilst the conveyor is stationary, move horizontally to discharge the articles onto a platform. The rods are then returned to their initial position and the next series of platters is lowered over the rods along the vertical run. Differences in the movement requirements of the loading and unloading station are accommodated by an accumulator system of known type. There is also described the hinged attachment of the platters to the chain conveyor so that adjacent platters may hinge relative to each other on the chain.

26 Claims, 13 Drawing Sheets

POUCH DELIVERY SYSTEM

The present invention relates to endless conveyors and has a particular but by no means exclusive relation to conveyors in which articles are loaded singly into the conveyor at a loading station and unloaded in stacked batch form at an unloading station.

BACKGROUND OF THE INVENTION

Machines for loading articles singly onto a conveyor and discharging them in batches are known, see for example U.S. Pat. No. 4,768,642 which provides a plurality of conveyors to which are attached material handling devices. The material handling devices attached to one belt are permitted to operate at one speed for loading of product and to stop or operate at a different speed for unloading but use the same loading and unloading stations as the other belt.

U.S. Pat. No. 3,954,165 shows an automatic collating machine for organizing into groups a flow of articles such as ice cream sandwiches.

In U.S. Pat. No. 5,018,334 there is described a conveyor in which articles are fed individually into a conveyor at a loading station and are off-loaded at an unloading station in batches. Differences in conveyor movement at the loading and unloading stations is compensated for by an accumulator. Accumulators are well known and are described, for example in U.S. Pat. No. 4,142,626, U.S. Pat. No. 4,168,776 and U.S. Pat. No. 4,513,858.

Whilst many of the machines of the prior art are very suitable for certain applications some of them lack the versatility for other applications and operations.

SUMMARY OF THE INVENTION

According to the present invention an endless conveyor means has a loading station and an unloading station; a plurality of article carrying platter means operatively connected to, and extending radially outwardly of, the conveyor means, each platter means cooperating with the next adjacent upper and lower platter means to provide an article receiving pocket means therebetween, at least one outwardly open slot extending longitudinally in each platter means radially outwardly of the conveyor means, the slot in one platter means being aligned with the slot in the next adjacent platter means; and at least one article discharging element, at the unloading station, to discharge an article from a platter means at the unloading station.

In one preferred feature at least one article discharging element comprises at least one article discharging rod, positioned in alignment with the slot and movable from an engaging position through a slot to a discharge position, whereby in operation, to discharge at least one article from a platter means at the unloading station.

Preferably the discharging rod is movable from an engaging position through a plurality of aligned slots to a discharging position, whereby, in operation, to discharge stacked articles from a plurality of adjacent platter means at the unloading station.

According to the present invention there is provided an endless conveyor means having a loading station and an unloading station, where the conveyor means has a vertical run, said conveyor means including a conveyor accumulator to accommodate variations in conveyor movement during loading and unloading; a plurality of article carrying platters operatively connected to, and extending radially outwardly of, the conveyor means, each platter co-operating with the next adjacent platter to provide an article receiving pocket means therebetween, at least one outwardly open slot extending longitudinally in each platter radially outwardly of the conveyor means, the slot in one platter being aligned with the slot in the next adjacent platter; and at least one horizontally reciprocal upstanding article discharging rod at the unloading station, positioned in alignment with the slot and movable horizontally from an engaging position where the inner ends of the slots of a plurality of adjacent platters are lowered over the rod at the vertical run, and a discharge position radially clear of the slots; whereby, in operation, to discharge stacked articles from a plurality of vertically stacked platters at the unloading station.

According to one preferred feature of the invention there is provided an endless conveyor means having a loading station and an unloading station, where the conveyor means has a vertical run, the conveyor means including a conveyor accumulator to accommodate variations in conveyor movement during loading and unloading; a plurality of article carrying platters operatively connected to, and extending radially outwardly of, the conveyor means, each platter co-operating with the next adjacent platter to provide an article receiving pocket means therebetween, a plurality of outwardly open slots extending longitudinally in the platters radially outwardly of the conveyor means, the slots in one platter being aligned with the slots in the next adjacent platter; and a plurality of horizontally reciprocal upstanding article discharging rods at the unloading station, positioned in alignment with the slots and movable horizontally from an engaging position where the inner end of the slots of a plurality of adjacent platters are lowered over the rods at the vertical run, and a discharge position radially clear of the slots; whereby, in operation, to discharge stacked articles from a plurality of vertically stacked platters at the unloading station.

According to another preferred feature of the invention, webs extend from at least one of an upper or lower face of the platters and may be accommodated in the next adjacent platter, to delimit a plurality of pockets transversely of the platters. Preferably webs extend from both upper and lower faces of the platters and preferably the webs may have substantially sinusoidal configuration portions which matingly engage with similar web portions in the next adjacent upper and lower platters.

According to another feature of the invention, an unloading platform is positioned at the unloading station to receive stacked articles discharged from the vertically stacked platters, the platform having at least one longitudinally extending slot aligned with the slot in the platters, and an unloading walking beam means located beneath the unloading platform, the unloading walking beam means carrying at least one upstanding unloading rod aligned with the platform slot and horizontally movable on the unloading walking beam means to move, in operation, to discharge stacked articles along the platform.

According to a further feature of the invention an unloading platform is positioned at the unloading station to receive stacked articles discharged from the vertically stacked platters, the platform having longitudinally extending slot aligned with each slot in the platters, and an unloading walking beam means located beneath the unloading platform, the unloading walking beam means carrying an upstanding unloading rod aligned with each slot in the platform and horizontally movable on the unloading walking beam means to move, in operation, to discharged stacked articles along the platform.

Conveniently a packing station is located at the end of the unloading platform and in operation, the unloading rods move stacked articles along the unloading platform at the packing station whereby to pack the containers.

According to yet a further preferred feature of the invention, a loading platform is located at the loading station and a loading walking beam means is located above the platform, loading rods means on the walking beam means, in operation, loading articles from the loading platform onto an individual platter momentarily stopped at the loading station.

According to a preferred feature an inclined ramp is positioned to deliver articles to the loading platform, a delivery conveyor having article engaging lugs moving articles up the inclined ramp. Conveniently the loading walking beam means has a greater horizontal speed than that of the delivery conveyor.

The present invention finds a particular application as a pouch conveyor and this is one preferred operation for it.

According to another aspect of the invention there is provided an endless conveyor means having a loading station and an unloading station, the conveyor having at least one endless chain, a plurality of article carrying platter means connected to and extending radially outwardly of the endless chain, each platter means co-operating with the next adjacent upper and lower platter means to provide an article receiving pocket means therebetween, each platter means having hinge lugs projecting upwardly and downwardly of each platter means and being arranged side by side transversely of the platter adjacent the point of connection to at least one chain, the hinge lugs in adjacent platter means co-operating to form a hinge portion between an adjacent pair of platter means, and a hinge pin adapted to pass through a bore in at least one chain and through aligned bores in adjacent mating upper and lower lugs to complete a hinge between adjacent platter means and to attach them to at least one chain.

According to a preferred aspect of the invention there is provided an endless conveyor means having a loading station and an unloading station the conveyor having at least one endless chain, a plurality of article carrying platter means connected to and extending radially outwardly of the endless chain, each platter means co-operating with the next adjacent upper and lower platter means to provide an article receiving pocket means therebetween, each platter means adjacent its point of connection to the chain having an upwardly extending hinge lug and an downwardly extending hinge lug arranged side by side transversely of the platter means, the underside of each upwardly extending lug being recessed to accommodate the corresponding upstanding lug on the next adjacent platter means beneath it, and each downwardly extending lug being recessed to accommodate the corresponding downwardly extending lug in the next adjacent platter means above it; a hinge pin receiving bore extending through each upwardly and downwardly extending lug and the bore in each upwardly extending lug being aligned, transversely of the platter means, with a corresponding pin receiving bore in the downwardly extending lug of the next adjacent platter means above it; a pin receiving bore in at least one chain aligned with each aligned bore lug and a hinge pin adapted to pass through the aligned bores in chain and lugs and secured to provide a hinge between two adjacent platter means and to attach them to at least one chain.

Preferably a pin-end accommodating recess is provided in the platter means, alongside the hinge lugs, to receive a pin end, and means to inhibit retraction of the pin in the pin-end.

BRIEF DESCRIPTION OF THE DRAWINGS

The following is a description by way of example of a preferred embodiment of the present invention, reference being had to the accompanying drawings in which:

FIG. 4, comprising sequence diagrams

DESCRIPTION OF THE PREFERRED EMBODIMENT

Figure 1:
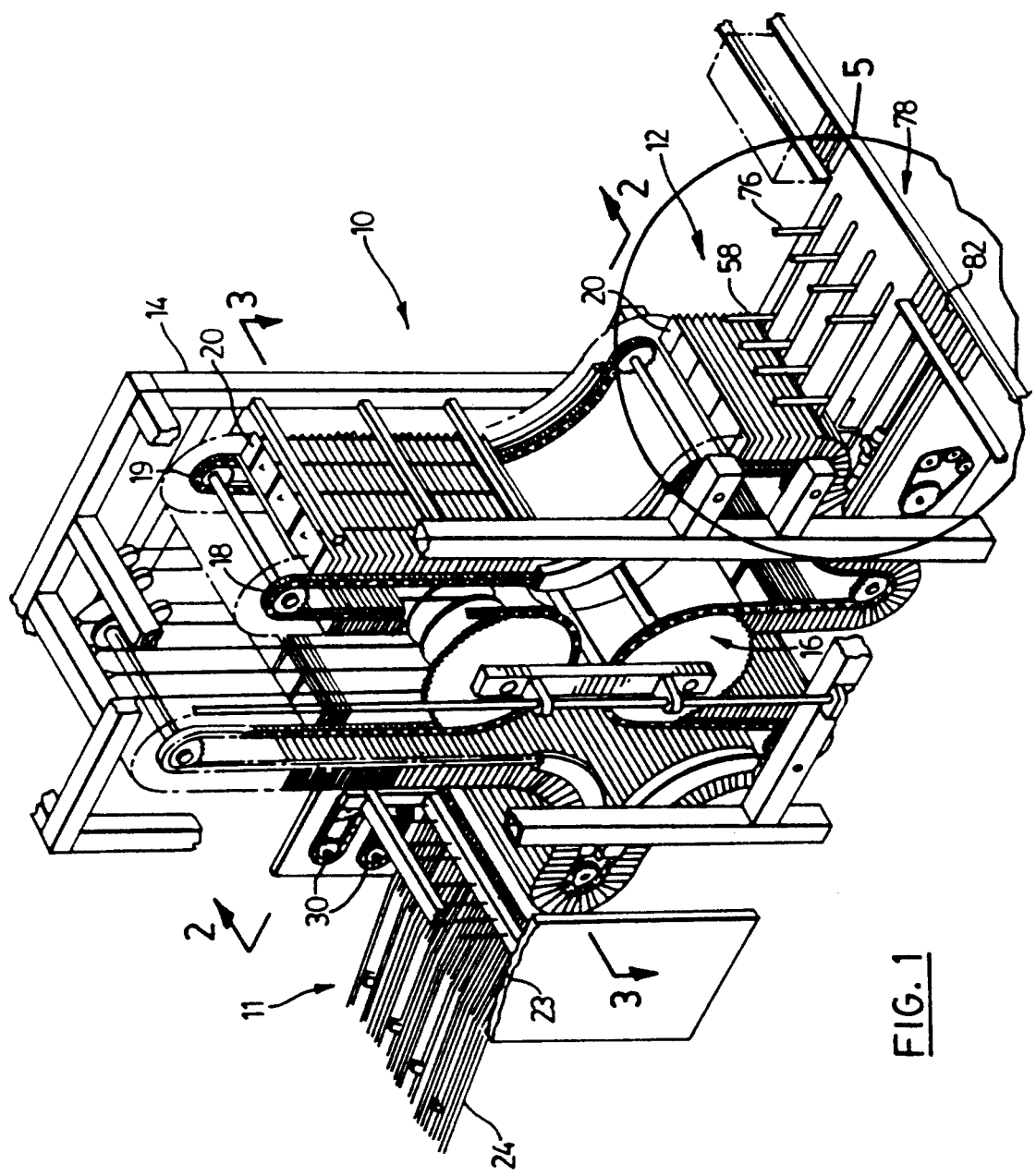
FIG. 1 is a schematic perspective view of a hesitating conveyor having loading and unloading stations and an accumulator system of known type.
Figure 2:
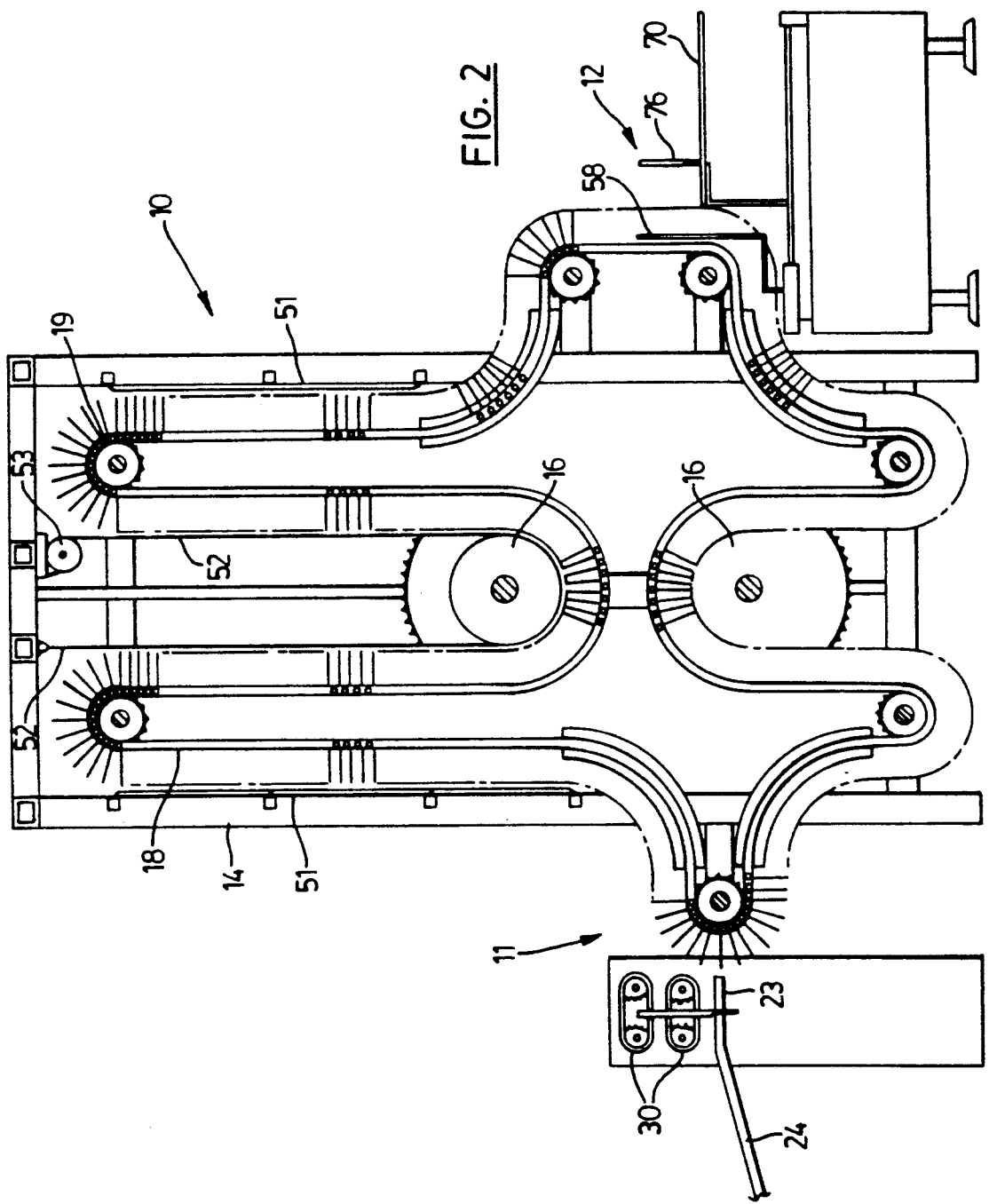
FIG. 2 is a schematic elevation on line 2—2 of FIG. 1 showing the route of the conveyor.

Turning now to the drawings. An endless conveyor 10 has a loading station 11 and an unloading station 12. The conveyor has a main frame 14 mounting the sprockets of the conveyor chain and incorporating an accumulator device 16 of known configuration. Parallel chain runs 18 and 19 are entrained over the sprockets and carry a series of platter means, shown schematically in this embodiment as platters 20 extending transversely of the conveyor and attached at either end to the parallel chain runs 18 and 19, as described more fully hereinafter.

Turning now more particularly to FIGS. 1 through 4C. Articles, such as pouches 22 are delivered to a loading platform 23 up an inclined ramp 24 by means of a delivery conveyor 25 (see FIGS. 4A, 4B and 4C). Projections 26 in the delivery conveyor 25 move the pouches 22 up the ramp 24 to the loading platform 23 at which time the pouches 22 are engaged by rod members 28 of a walking beam type device 30. The walking beam device moves at a horizontal speed faster than the delivery conveyor 25 and the rod members 28, as they move downwardly by the action of the walking beam (see FIG. 4A), engage in the slots 32 in the platform 23 and whisk the pouches along the platform away from the slower moving delivery conveyor projections 26. In FIG. 1 only one walking beam has been shown for clarity but it will be understood that as many walking beams as necessary will be located transversely of the conveyor 10. Furthermore, where necessary the timing of the walking beams 30 may be co-ordinated with the movement of the delivery conveyor 25.

Figure 4A:
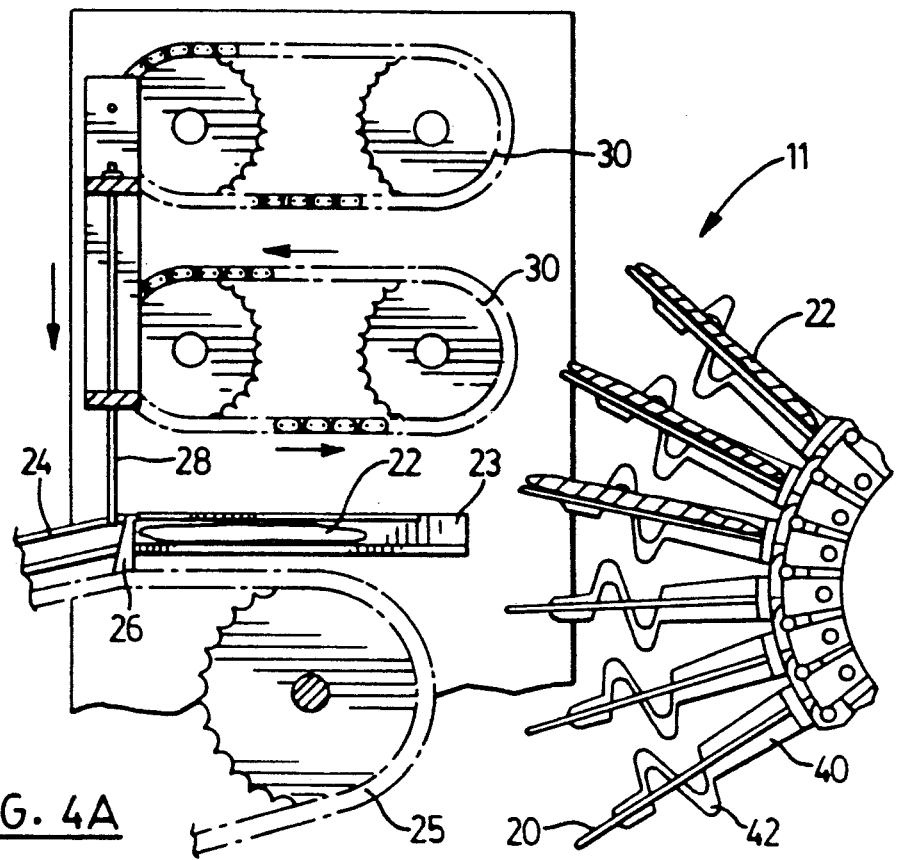
FIGS. 4A, 4B, 4C show the loading operation at the loading station shown in FIG. 3 the view being sectioned along the line 4—4 in FIG. 3.
Figure 4B:
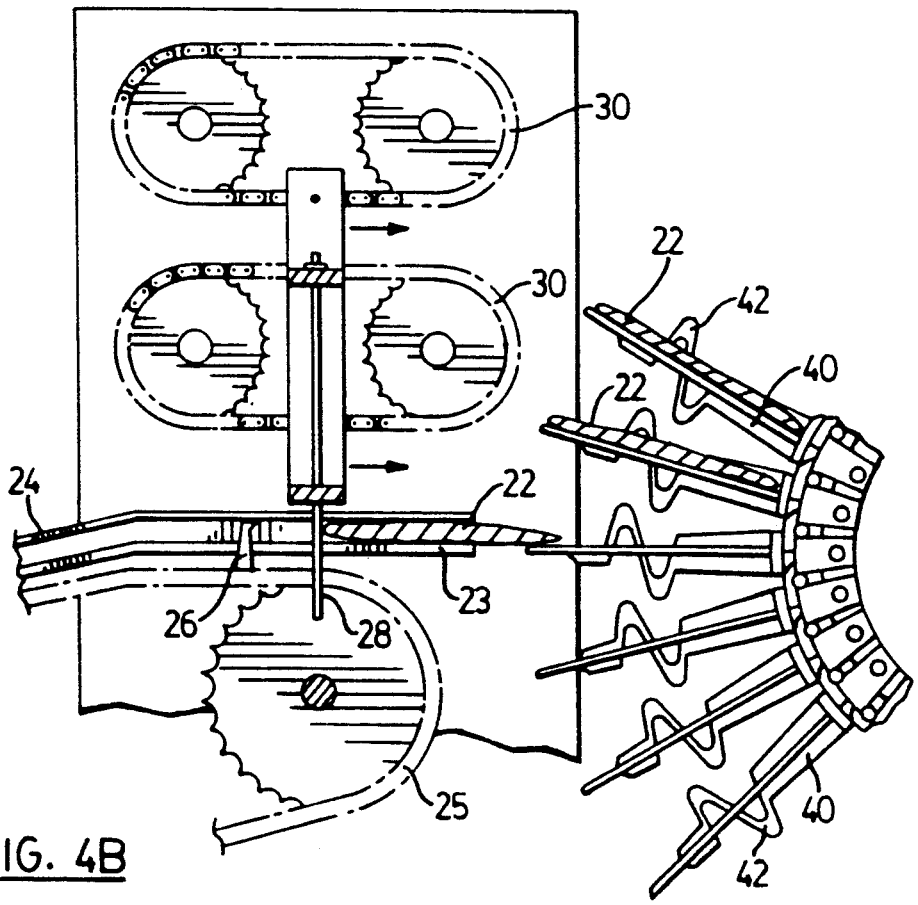
Figure 4C:
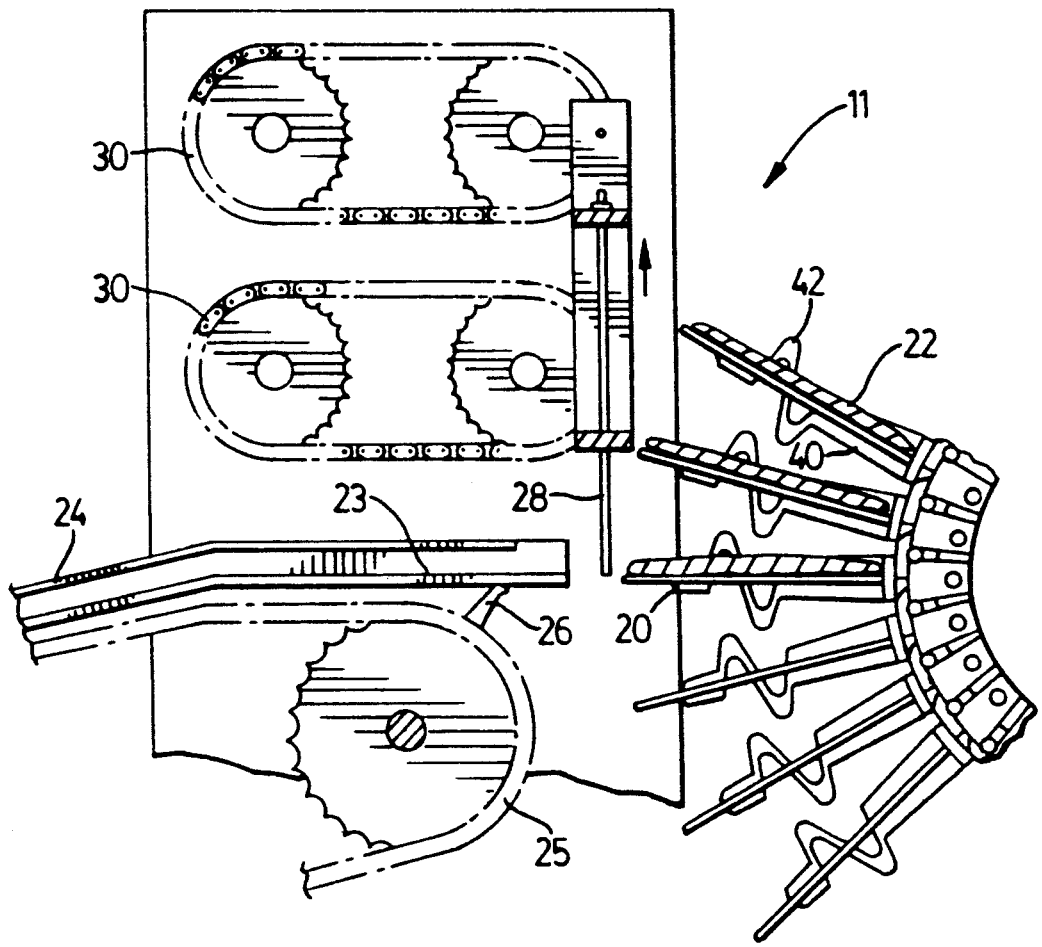

Preferably flanges 29 are provided at the loading platform and where desirable on the inclined ramp to retain the pouches 22 on the platform particularly when they are acted upon by the walking beam rod members 28. The pouches 22 are pushed from the loading platform 23 onto a platter 20 in the loading station, in the fashion shown in FIGS. 4A, 4B and 4C. The loading rod 28 prohibits any tendency for the loaded pouch 22 to rebound off the platter, as seen in FIG. 4C.

Figure 8:
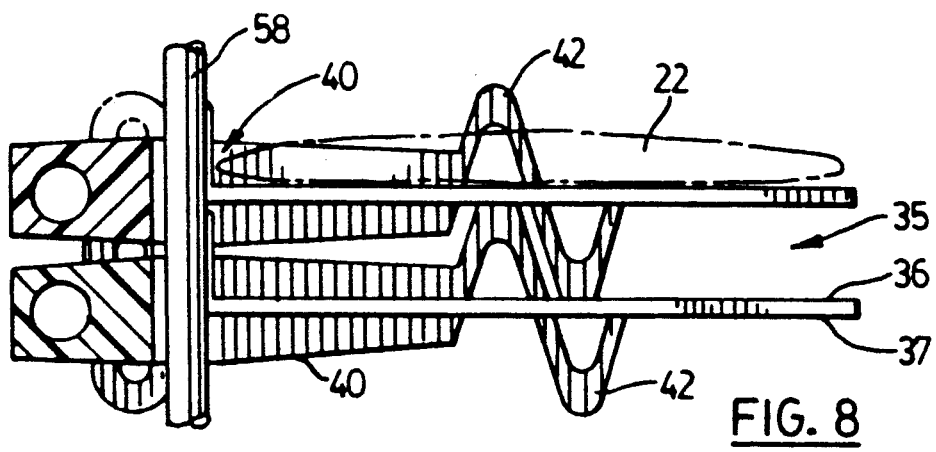
FIG. 8 is a section on the lines 8—8 of FIGS. 7 showing two adjacent platters in co-operating configuration.

As best seen in FIG. 8, the platters 20 form with the next adjacent platters 20 a pocket means 35 between them.

In the configuration shown in FIGS. 1-9, the individual platters have their pocket means 35 divided into a plurality of transverse pockets by means of outstanding webs 40 which extend from both upper and lower faces 36, 37 of platters 20. The webs 40 preferably have portions 42 of substantially sinusoidal configuration which matingly engage with similar portions in the next adjacent upper or lower platters. For example, in FIG. 9, sinusoidal projection 43a is received into pocket 43b, and likewise sinusoidal projection 41a is received into pocket 41b. It will be appreciated that the specific configuration of webs 40 and sinusoidal portions 42 can vary. For example, as will be seen in FIG. 9 the substantially sinusoidal web portions 42 may, if desired, be flattened somewhat at their bottoms. The webs 40 serve to retain the pouches 22 within the pockets whilst the substantially sinusoidal portions 42 provide further stability for the pouches when the platters are negotiating sprockets on the conveyor and tend to open up the pockets. For each pocket on each platter there is provided an outwardly open slot 45 (see particularly FIGS. 3 and 7). The slots 45 in all the platters are vertically aligned.

Figure 3:
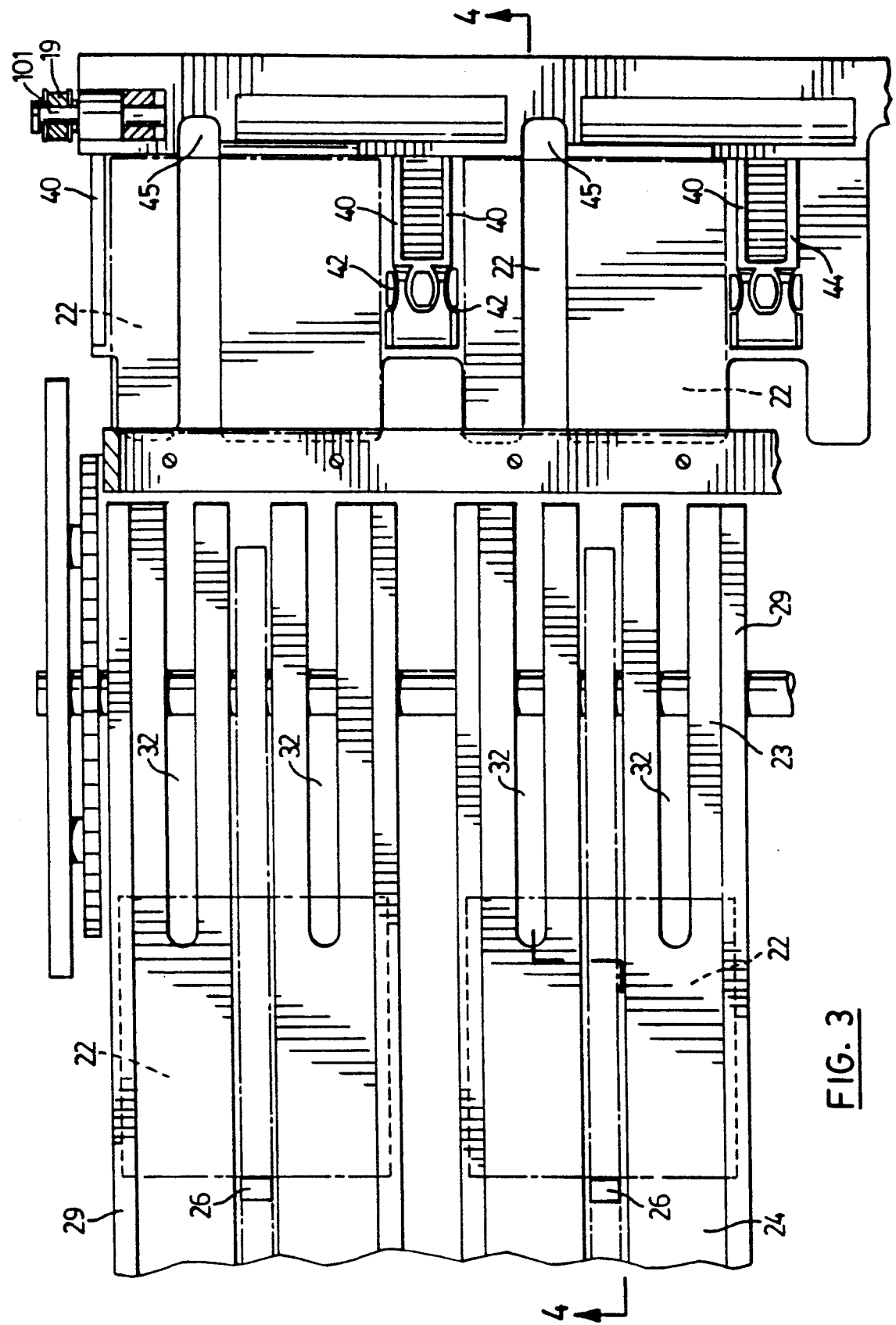
FIG. 3 is a detail view in plan of the loading station of FIG. 1 taken along a horizontal plane passing through line 3—3 as shown in FIG. 1.
Figure 9:
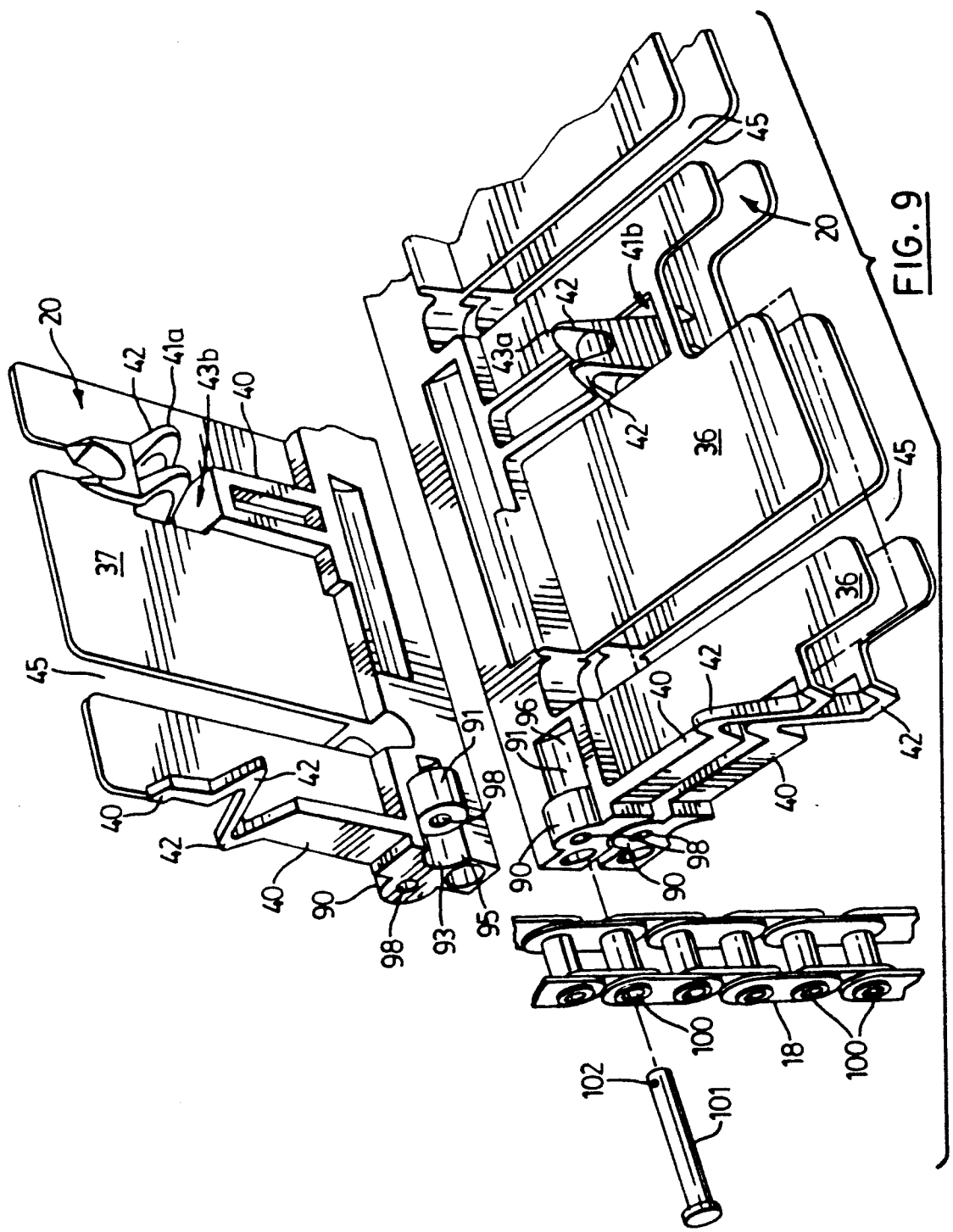
FIG. 9 is a perspective view of the platters with one of the platters and the means for engaging the platters to the chain of the chain conveyor shown exploded.

It will be noted in FIG. 9 that the uppermost platter (shown exploded away) has webs 40 and sinusoidal portions 42 of the embodiment depicted in FIG. 3. The lower platters of FIG. 9 have webs 40 and sinusoidal portion 42 of the embodiment depicted in FIG. 7.

After loading the pockets on an individual platter at the loading station 11 the conveyor then moves along its path, adjacent platters coming together on the vertical runs to closely define the pockets with upper and lower limitations. Restraining rods 51 (see FIG. 2) extend along vertical runs of the conveyor to ensure against any tendency for pouches to move out from between the platters. To provide restraint for the pouches 22 on the platters and at the same time to follow the conveyor accumulator movement, an article restraining cable 52 having an inertia take-up reel 53 is provided. The restraining cable follows the motion of the accumulator 16.

The coveyor progresses until loaded platters arrive at the unloading station 12 where they pass down the vertical run 55 of the conveyor.

Figure 5:
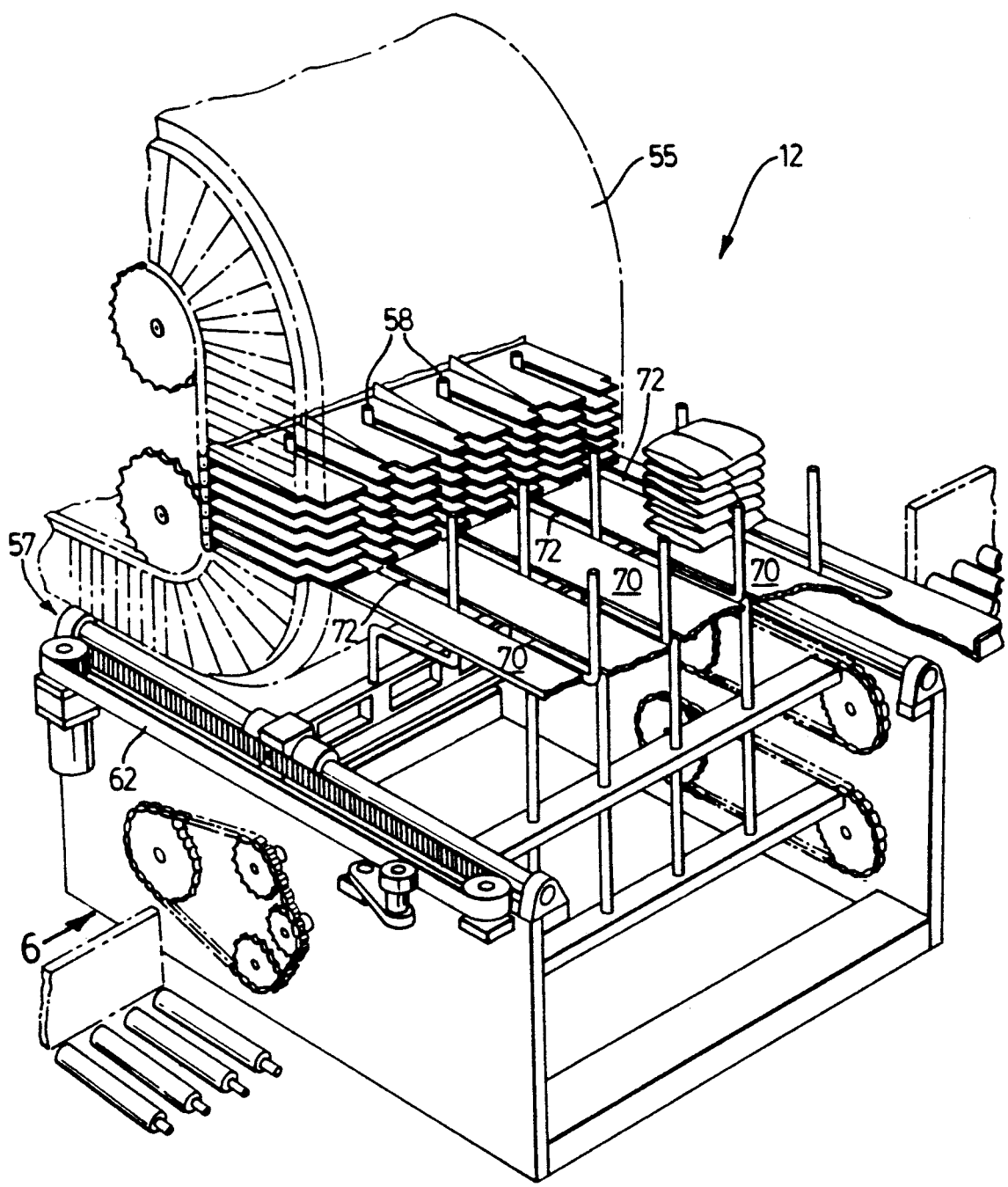
FIG. 5 is an enlarged detail, in perspective, of the unloading station circled and marked 5 in FIG. 1, showing very schematically a plurality of article carrying platters.
Figure 6A:
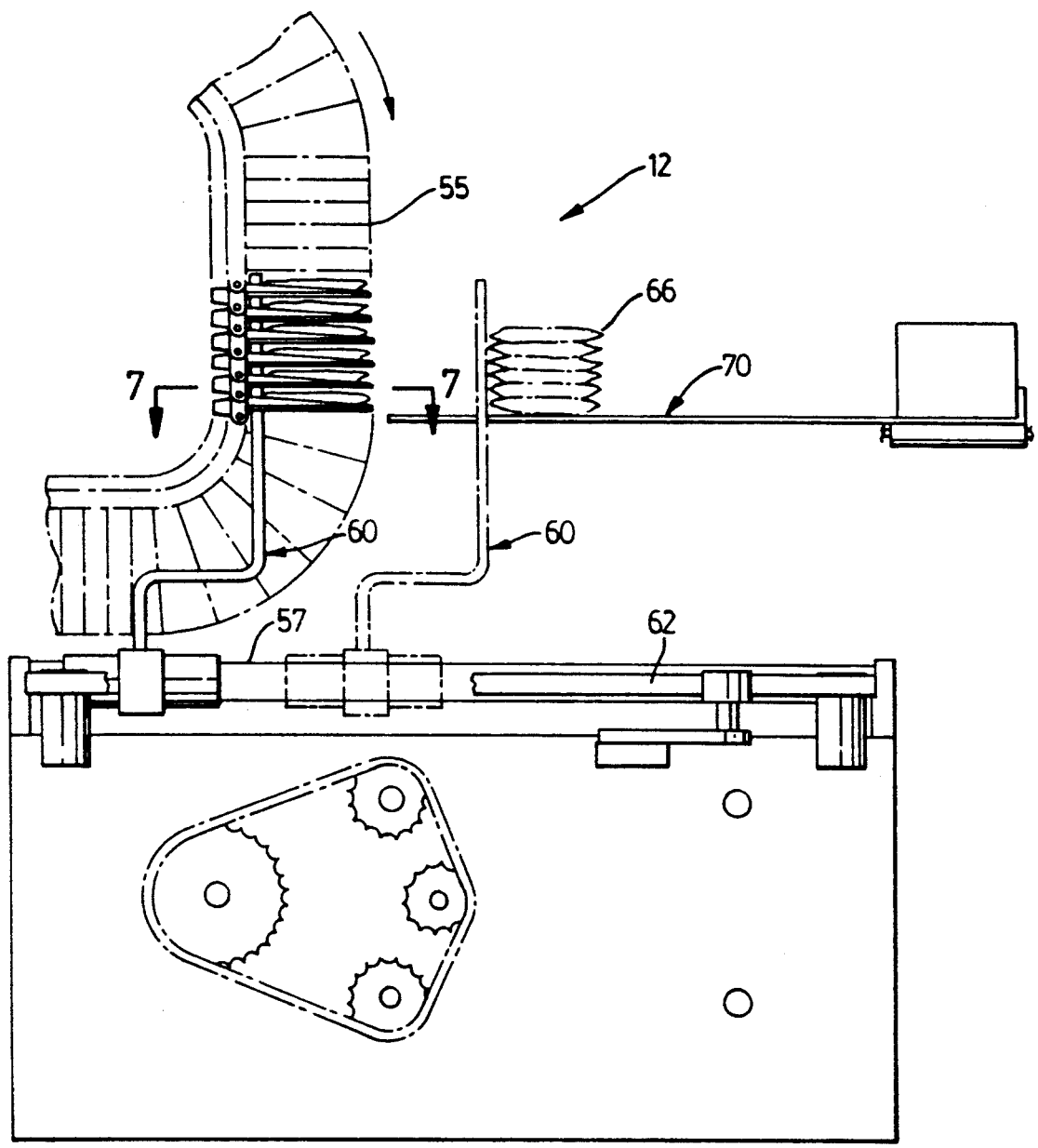
FIG. 6A is a schematic detail looking in the direction of the arrow 6 in FIG. 5 and showing the operation of the initial discharge of a batch of stacked articles from the conveyor at the unloading station.

As best seen in FIG. 5 and 6A a series of transversely spaced upwardly extending discharge rods 58 are mounted on a frame 57. One discharge rod 58 is provided for each slot in the platter. The platters encounter the rod 58 when they are in the retracted position 60 (see FIG. 6A). A series of vertically adjacent platters 20 are moved down by the conveyor over the rods 58 which move relatively upwardly through the aligned slots 45 at the inner ends thereof (see FIGS. 5 and 7). The conveyor is then stopped and the discharge rods 58 are moved horizontally (to the right in FIG. 6A) by means of a belt drive 62 on the frame 57 to push a stack 66 of pouches of the platters and onto an unloading platform 70 which is provided with slots 72 aligned with the slots 45 in the platters. The belt drive 62 then acts to reciprocate the rods 58 back to their starting position at 60 ready to receive the lowering of the next series of stacked platters above those just unloaded, on the vertical run 55 of the conveyor.

Figure 6B:
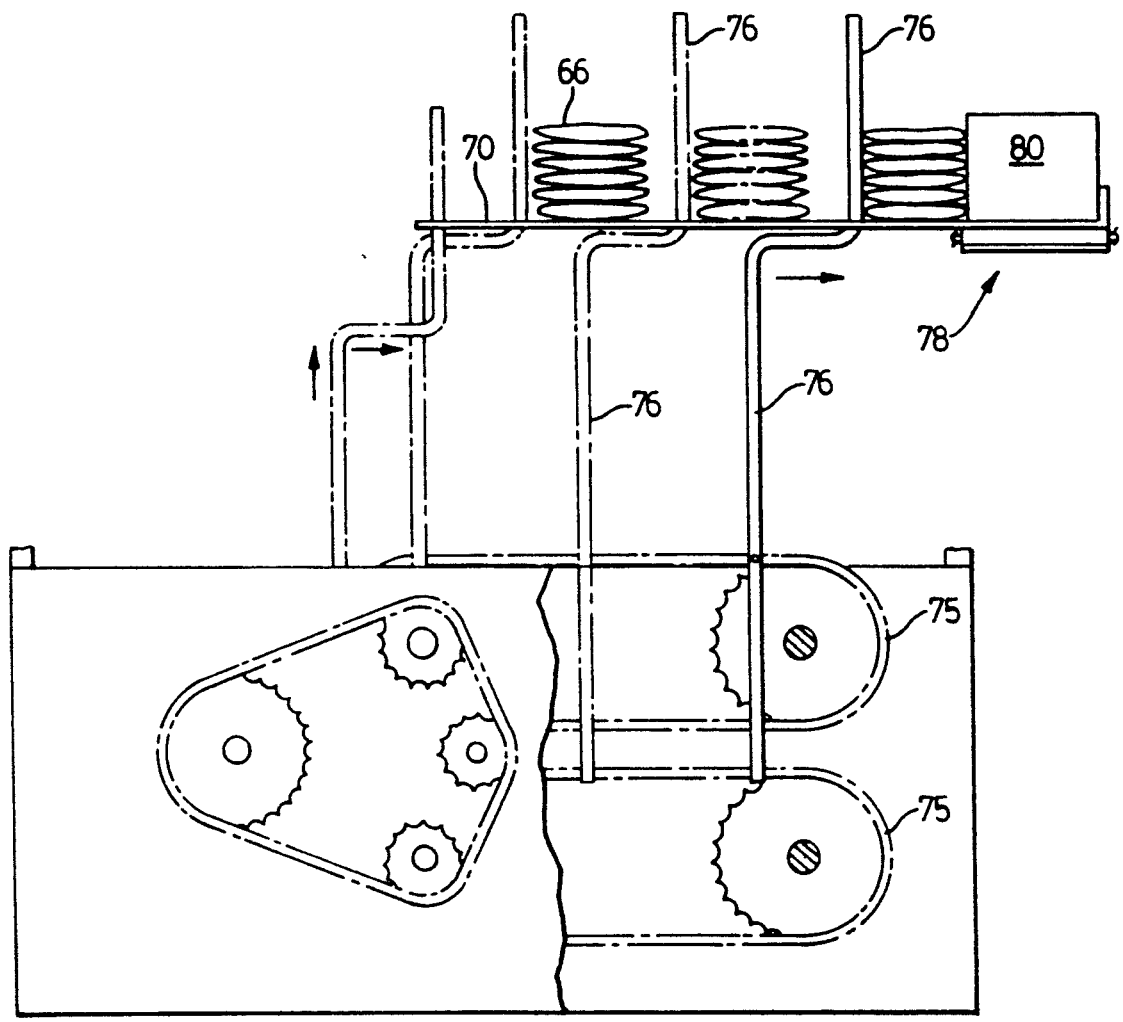
FIGS. 6B and 6C are views similar to FIG. 6A and show the operation of a walking beam device to move stacked articles along a platform at the unloading station to a container.
Figure 6C:
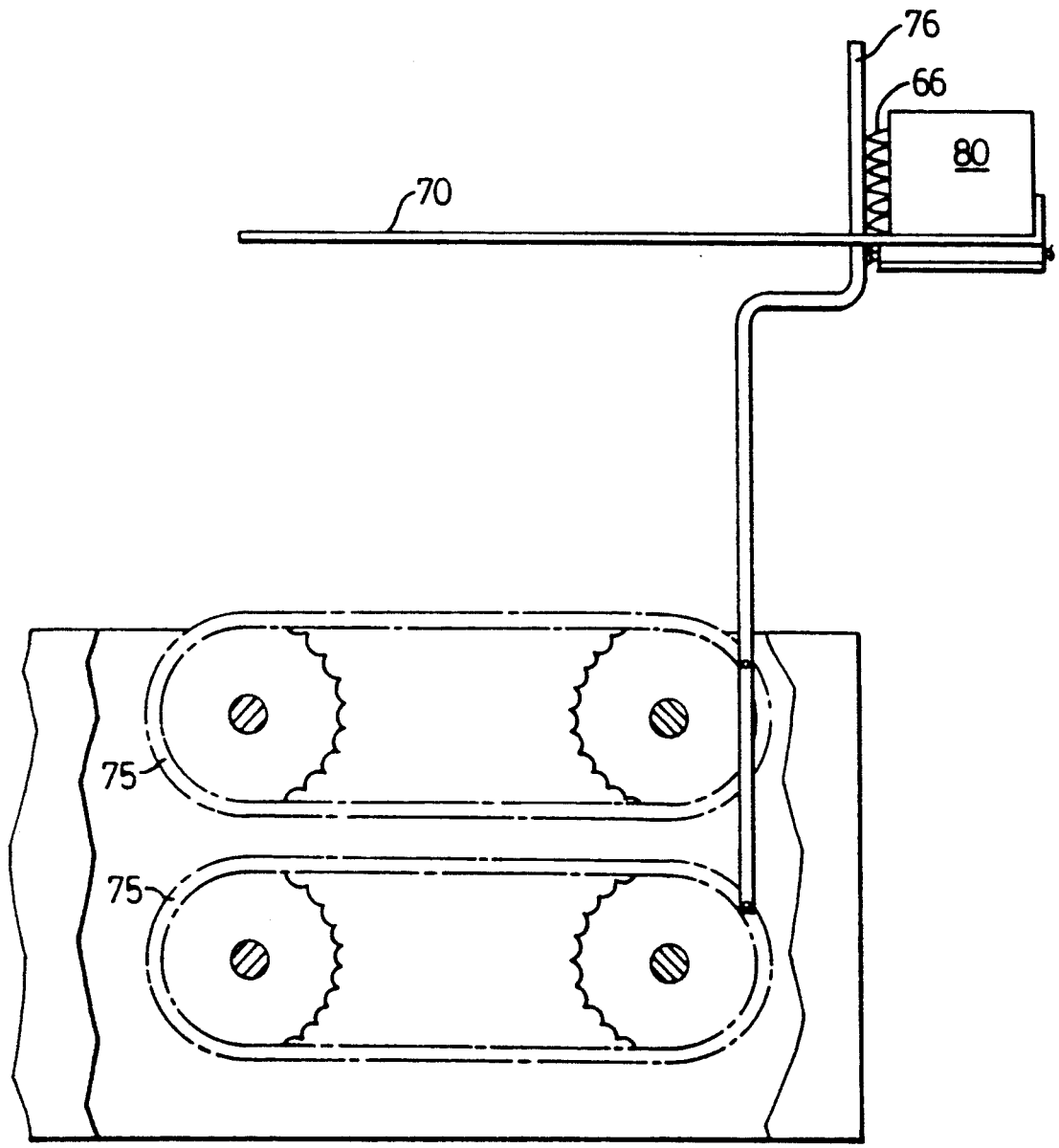
Figure 6D:
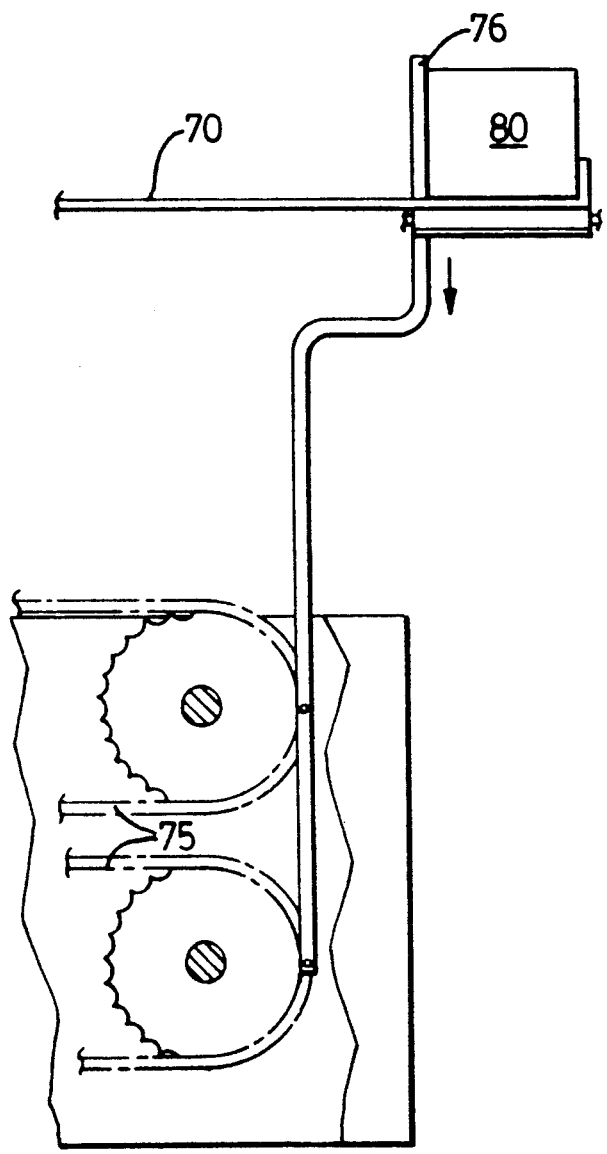
FIG. 6D is a view similar to FIGS. 6B and 6C and shows the completion of packing of the container by the walking beam of FIGS. 6B and 6C.

Turning now to FIGS. 6B, 6C and 6D. Beneath the unloading platform 70 is an unloading walking beam device 75. On the return of the discharge rods 58 to their position 60 unloading rods 76, one for each slot 72 in the unloading platform 70 move up through the slot 72 (see FIG. 6B) behind the stack 66 of pouches deposited by the discharge rods 58. The unloading rods 76 move the stack 66 further to the right, as seen in FIG. 6B, 6C and 6D along the unloading platform 70 to a packing station 78. The discharged stacked pouches are moved off the platform 70 into a container 80 positioned at the packing station 78 and, as see in FIGS. 6C and 6D, the unloading rods 76 pack the stacked articles into the container 80 whereafter it is moved transversely on the rollers 82 away from the packing station 78 where its place is taken by another container ready for filling.

Figure 7:
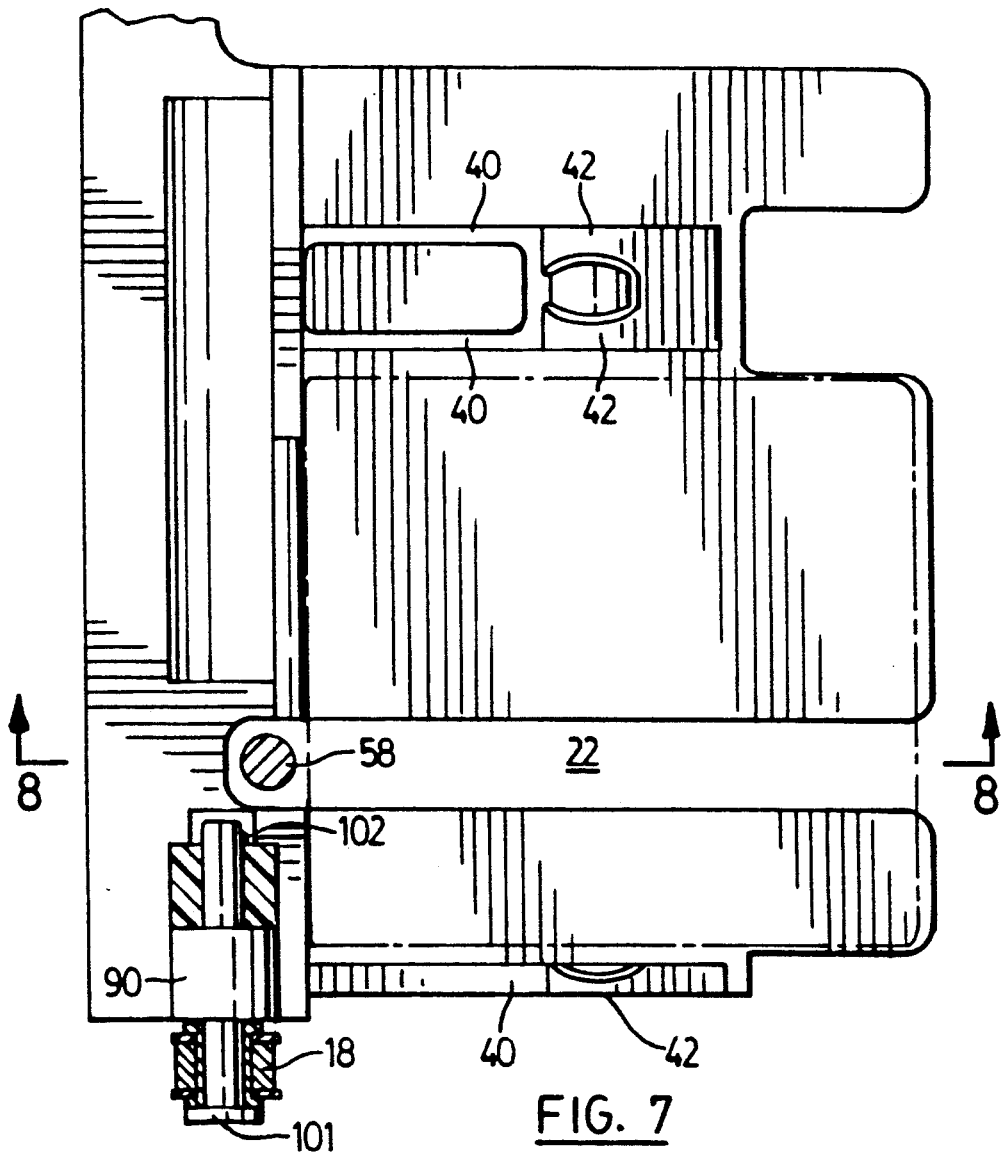
FIG. 7 is a detail of an individual article carrying platter, shown in plan.

Turning now particularly to FIGS. 7, 8 and 9 the manner of attachment of the platter means, shown in those figures as platters 20 to the chain 18 will be described.

It will be understood that whilst the uniting of one side only of the platter 20 and one chain 18 has been shown for ease of description, the other chain 19 and its side of the platters 20 will be united in the same fashion. Each platter 20 adjacent its point of connection to the chain 18 has an upwardly extending hinge lug 90 and downwardly extending hinge lug 91. The hinge lugs 90, 91 are arranged side-by-side transversely of the platter 20. The underside 93 of each upwardly extending lug 90 is recessed at 95 to accommodate the corresponding upstanding lug 90 on the next adjacent platter beneath it. Each downwardly extending lug 91 is recessed at 96 to accommodate the corresponding downwardly extending lug 91 in the next adjacent platter above it. A hinge pin receiving bore 98 extends through each upwardly (90) and each downwardly (91) extending lug and when assembled, the bore in each upwardly extending hinge lug is aligned, transversely of the platter 20 with the corresponding hinge pin receiving bore in the cooperating downwardly extending lug of the next adjacent platter above. A pin receiving bore 100 is provided in the chain 18 for alignment with each pair of aligned bores for the passing of a hinge pin 101 through the bore in the chain 100 into the bores 98 of the cooperating upwardly and downwardly extending lugs 90, 91. This attaches two adjacent platters to the chain and permits the hinging of each platter relative to its immediately adjacent platter, both above and below. Conveniently, the recess 96 is extended a distance somewhat greater than is necessary to accommodate the downwardly extending lug 91 and this extension accommodates the end of the pin 101 which has a suitable retaining means, in the instance shown, a retractable detent means 102 which extends radially from the pin (see particularly FIG. 7). When it is desired to quick release a platter from the chain the detent means 102 is depressed, the pin 101 removed from the chain and cooperating adjacent platters, and these platters removed from the conveyor.

Figure 11:
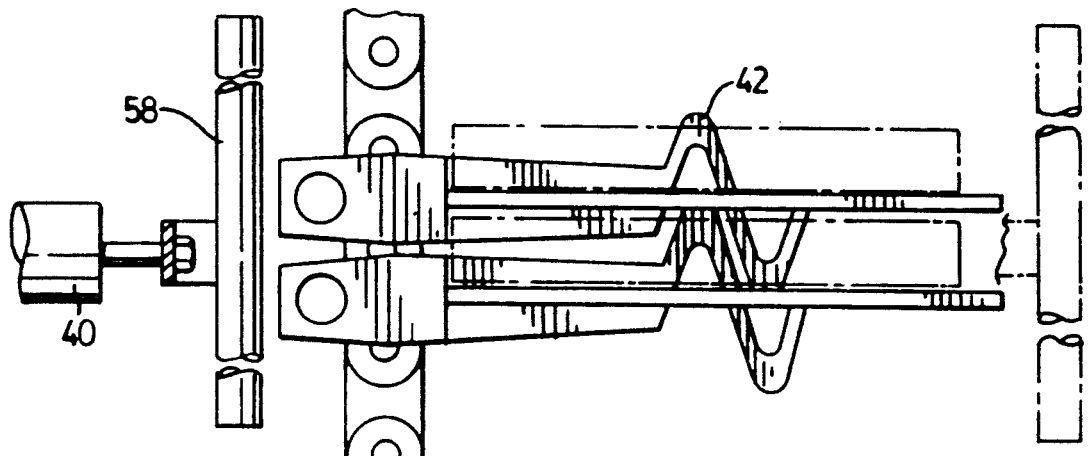
FIG. 11 is a view looking in the direction of 11—11 in FIG. 10.
Figure 10:
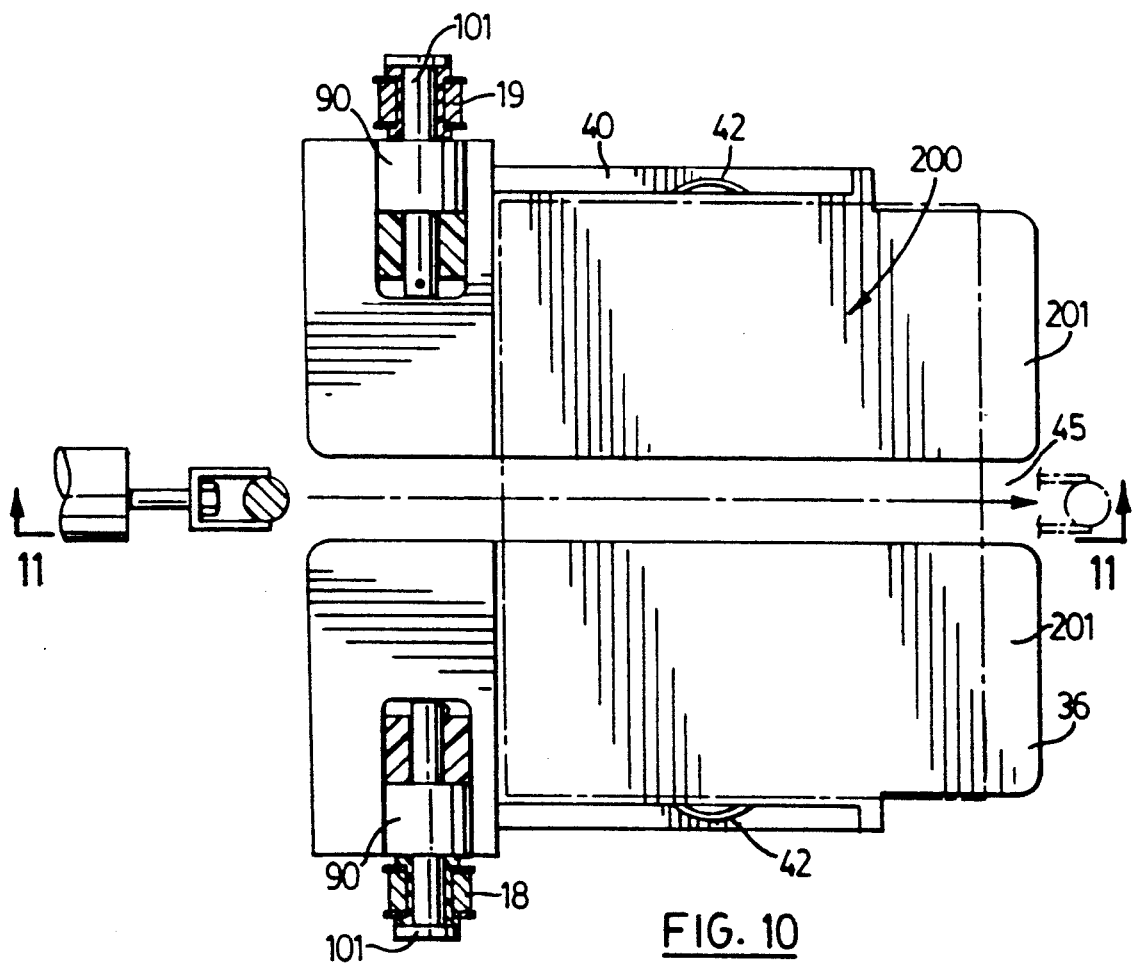
FIG. 10 is a view similar to FIG. 7 but shows a different embodiment of the invention.

Turning now to the embodiment shown in FIGS. 10 and 11 where like parts have been given like reference numerals. In this instance the platter means 200 is actually formed as two half platters 201 separated by the slot 45 which extends completely between the two half platters. The two half platters 201, forming the platter means 200 are similarly provided with hinge lugs 90, 91 nesting in recesses in the corresponding hinge lugs 90, 91 in the next adjacent half platter above and below and connected, as before to the chains 18, 19 by means of pins 101. Particularly where large items are required to be carried, the spacing between adjacent platters may be quite great and the discharge rod 58, located on the machine frame inside the conveyor, and operable by a fluid cylinder 110 on the frame may be used to discharge a single package 20 of the platter means. Although shown in an upstanding configuration, it will be understood that in some instances the discharge rod could have a different orientation and discharge from the conveyor at other than a vertical run.

It will be further understood that the conveyor device of the present invention may involve only one conveyor chain 18 (or 19) fully supporting the platter means in cantilever fashion.

It will be further understood that although only two chains 18 and 19 have been shown, in addition to envisaging the operation with a single chain, the invention also envisages the use of more than two chains. Equally well, more pockets than are herein illustrated could be provided in the platters and it will be understood that the present invention, although it is particularly suitable for the handling of pouches, is versatile enough to accommodate a number of uses.

It will yet further be understood that although the preferred use of the features of this invention is with devices which incorporate accumulators and indeed the most preferred use of the device is with a conveyor having an accumulator and on which articles are loaded singly and unloaded in batches, the device, in most of its aspects, is applicable to a wide variety of conveyor devices.

Because of the hesitation type operation of endless conveyors with accumulators is well known in the art, the specific drive mechanisms or mechanisms to operate the accumulator do not need to be described.

Furthermore, although the term "walking beam" has been applied herein to devices which may not have a classical walking beam configuration, it is believed that the term is correctly used in that the functions involved are those of a walking beam.

What we claim as our invention is:

1. An endless conveyor means having a loading station and an unloading station, where said conveyor means has a generally vertical run, said conveyor means including a conveyor accumulator to accommodate variations in conveyor movement during loading and unloading; a plurality of article carrying platters operatively connected to, and extending outwardly of, said conveyor means, each platter co-operating with the next adjacent platter to provide an article receiving pocket means therebetween, each said platter having upper and lower faces and having at least two webs extending from both said upper and lower faces, said at least two webs being accommodated in the next adjacent platter to delimit at least one pocket transversely of said platters, an outwardly open slot having an inner end and extending longitudinally in each platter outwardly of said conveyor means, the slot in one platter being aligned with the slot in the next adjacent platter; a generally horizontally reciprocal upstanding article discharging rod at said unloading station, positioned in alignment with the slots of platters at the unloading station and movable generally horizontally from an engaging position where the discharge rod is at the inner ends of the slots of said platters at said unloading station, to a discharging position; whereby, in operation, said conveyor means is stopped at said unloading station and subsequently stacked articles are discharged from a plurality of generally vertically stacked platters at said unloading station.

2. An endless conveyor means having a loading station and an unloading station, where said conveyor means has a generally vertical run, said conveyor means including a conveyor accumulator to accommodate variations in conveyor movement during loading and unloading; a plurality of article carrying platters operatively connected to, and extending radially outwardly of, said conveyor means, each platter co-operating with the next adjacent platter to provide an article receiving pocket means therebetween, each said platter having upper and lower faces and having at least two webs extending from both said upper and lower faces, said at least two webs being accommodated in the next adjacent platter to delimit at least one pocket transversely of said platters, a plurality of outwardly open slots extending longitudinally in said platters outwardly of said conveyor means, the slots in one platter being aligned with the slots in the next adjacent platter; and a plurality of generally horizontally reciprocal upstanding article discharging rods at said unloading station, positioned in alignment with said slots and movable generally horizontally from an engaging position where the inner end of the slots of a plurality of adjacent platters are lowered over said rods at said run, and a discharge position; whereby, in operation, said conveyor means is stopped at said unloading station and subsequently stacked articles are discharged from a plurality of vertically stacked platters at said unloading station.

3. Apparatus as claimed in claim 1 or 2 in which the at least two webs have at least some web portions which are substantially sinusoidal in configuration and which matingly engage with similar web portions in the next adjacent upper and lower platters.

4. Apparatus as claimed in claim 1 in which an unloading platform is positioned at said unloading station to receive stacked articles discharged from said vertically stacked platters, said platform having a at least one longitudinally extending slot aligned with said slot in said platters, and an unloading walking beam means located beneath said unloading platform, said unloading walking beam means carrying at least one upstanding unloading rod aligned with said platform slot and horizontally movable on the unloading walking beam means to move, in operation, to discharge stacked articles along said platform.

5. Apparatus as claimed in claim 2 in which an unloading platform is positioned at said unloading station to receive stacked articles discharged from said vertically stacked platters, said platform having a longitudinally extending slot aligned with each slot in said platters, and an unloading walking beam means located beneath said unloading platform, said unloading walking beam means carrying an upstanding unloading rod aligned with each slot in said platform and horizontally movable on the unloading walking beam means to move, in operation, to discharge stacked articles along said platform.

6. Apparatus as claimed in claim 5 in which a packing station is located at the end of said unloading platform and, in operation, said unloading rods move stacked articles along said unloading platform at said packing station, whereby to pack said containers.

7. Apparatus as claimed in claim 1 or 2 in which the endless conveyor means is a pouch conveyor.

8. An endless conveyor means having a loading station and an unloading station said conveyor having at least one endless chain, a plurality of article carrying platter means connected to and extending outwardly of said endless chain, each platter means co-operating with the next adjacent upper and lower platter means to provide an article receiving pocket means therebetween, each platter means having hinge lugs projecting upwardly and downwardly of each platter means and being arranged transversely of the platter aligned with the point of connection to said at least one chain, the upwardly and downwardly projecting hinge lugs of each platter means being accommodated in upwardly and downwardly extending recesses of the next upper and lower adjacent platter means, respectively, the hinge lugs of a pair of adjacent platter means cooperating to form a hinge portion between said adjacent pair of platter means, and a hinge pin adapted to pass through a bore in said at least one chain and through aligned bores in adjacent mating upper and lower lugs to complete a hinge between said pair of adjacent platter means and to attach them to said at least one chain.

9. An endless conveyor means having a loading station and an unloading station said conveyor having at least one endless chain, a plurality of article carrying platter means connected to and extending radially outwardly of said endless chain, each platter means co-operating with the next adjacent upper and lower platter means to provide an article receiving pocket means therebetween, each platter means adjacent its point of connection to the chain having an upwardly extending hinge lug and an downwardly extending hinge lug arranged side by side transversely of the platter means, the underside of each upwardly extending lug being recessed to accommodate the corresponding upstanding lug on the next adjacent platter means beneath it, and each downwardly extending lug being recessed to accommodate the corresponding downwardly extending lug in the next adjacent platter means above it; a hinge pin receiving bore extending through each upwardly and downwardly extending lug and the bore in each upwardly extending lug being aligned, transversely of the platter means, with a corresponding pin receiving bore in the downwardly extending lug of the next adjacent platter means above it; a pin receiving bore in said at least one chain aligned with each aligned bore lug and a hinge pin adapted to pass through the aligned bores in chain and lugs and secured to provide a hinge between two adjacent platter means and to attach them to said at least one chain.

10. A device as claimed in claim 8 or claim 9 in which a pin-end accommodating recess is provided in said platter means, alongside said hinge lugs, to receive a pin end, and means to inhibit retraction of said pin in said pin-end.

11. A device as claimed in claim 10 in which said means to inhibit retraction comprises a retractable detent means extending radially of said pin.

12. A device as claimed in claim 8 or claim 9 in which a plurality of endless chains are provided.

13. A device as claimed in claim 12 in which opposite ends of said platter means are similarly connected to adjacent pairs of endless chains.

14. A device as claimed in claim 13 in which said platter means span the space between said adjacent chain pairs.

15. An endless conveyor means having a loading station and an unloading station, where said conveyor means has a generally vertical discharge run, said conveyor means including a conveyor accumulator to accommodate variations in conveyor movement during loading and unloading; a plurality of article carrying platters operatively connected to, and extending outwardly of, said conveyor means, each platter co-operating with the next adjacent platter to provide an article receiving pocket means therebetween, an outwardly open slot having an inner end and extending longitudinally in each platter being outwardly of said conveyor means, the slot in one platter being aligned with the slot in the next adjacent platter; a generally horizontally reciprocal upstanding article discharging rod at said unloading station, positioned in alignment with the slots of platters at the unloading station and movable generally horizontally from an engaging position where the discharge rod is at the inner ends of said slots of said platters at said unloading station, to a discharging position; an unloading platform positioned at said unloading station to receive a stack of articles discharged from said platters at said unloading station by said discharging rod, said platform having a longitudinally extending slot aligned with said slots of platters at said unloading station; an unloading walking beam means carrying an upstanding walking rod, said walking rod aligned with said slot in said platform, said walking rod movable from a first position remote from said platform generally vertically through said slot in said unloading platform to a second engagement position to engage a stack of articles discharged by said discharge rod, and thereafter said walking rod movable generally horizontally along said slot in said unloading platform to move a stack of articles along said unloading platform to an off-loading position, thereafter said walking rod means movable generally vertically from said slot to a fourth position remote from said platform, and thereafter said walking rod movable generally horizontally to return to said first position, whereby, in operation, said conveyor means is stopped at said unloading station and subsequently stacked articles are discharged from a plurality of generally vertically stacked platters at said unloading station on to said unloading platform by horizontal movement of said discharging rod from the engaging position to the discharge position, thereafter said discharging rod moving from the discharge position to the engaging position and said walking rod moving the stacked articles along the unloading platform to the platform off-loading position.

16. An endless conveyor means having a loading station and an unloading station, said conveyor means including a conveyor accumulator to accommodate variations in conveyor movement during loading and unloading; a plurality of article carrying platters operatively connected to, and extending outwardly of, said conveyor means, each platter co-operating with the next adjacent platter to provide an article receiving pocket means therebetween; a loading platform located at said loading station having a longitudinally extending slot, and a loading walking beam means having at least one walking rod located proximate said platform, said at least one walking rod on said walking beam means being longitudinally aligned with said slot, said walking rod movable from a first disengaged position remote from said loading platform generally vertically to a second position wherein said said rod extends at least partially through said slot, said walking rod thereafter movable generally horizontally through said slot to engage an article located on said platform to a third position to push said article to into an article receiving pocket, said rod thereafter movable generally vertically to a fourth position remote from said platform, and thereafter said walking rod movable back to said first position, in operation, said walking rod loading an article from said loading platform into an article receiving pocket.

17. Apparatus as claimed in claim 16 in which an inclined ramp is positioned to deliver articles to said loading platform, a delivery conveyor having article engaging lugs, in operation, moving articles up said inclined ramp.

18. Apparatus as claimed in claim 17 in which said loading walking beam means has a greater horizontal speed than that of said delivery conveyor.

19. Apparatus as claimed in claim 16 in which said walking rod prevents rebound of a loaded article from said individual platter.

20. Apparatus as claimed in claim 16 in which restraining flanges are located on said loading platform to maintain, in operation, an article thereon during engagement by said walking rod.

21. Apparatus as claimed in claim 16 wherein said loading walking beam means is located above said platform.

22. Apparatus as claimed in claim 21 further comprising an inclined ramp positioned to deliver articles to said loading platform and a delivery conveyor having article engaging lugs, in operation, moving articles up said inclined ramp.

23. Apparatus as claimed in claim 21 in which said at least one walking rod prevents rebound of a loaded article from said individual platter.

24. Apparatus as claimed in claims 23 in which restraining flanges are located on said inclined ramp to maintain, in operation, an article thereon during engagement by said article engaging lugs.

25. An endless conveyor means having a loading station and an unloading station, where said conveyor means has a generally vertical discharge run, said conveyor means including a conveyor accumulator having a series of vertical runs, to accommodate variations in conveyor movement during loading and unloading; a plurality of article carrying platters operatively connected to, and extending outwardly of, said conveyor means, each platter co-operating with the next adjacent platter to provide an article receiving pocket means therebetween, an outwardly open slot having an inner end and extending longitudinally in each platter outwardly of said conveyor means, the slot in one platter being aligned with the slot in the next adjacent platter; a generally horizontally reciprocal upstanding article discharging rod at said unloading station, positioned in alignment with the slots of platters at the unloading station and movable generally horizontally from an engaging position where the rod is at inner ends of said slots, to a discharging position; a vertically extending conveyor restraining means extending along at least some of said vertical runs means to maintain articles on said platter during conveyor movement wherein said conveyor restraining means include an article restraining cable having an inertia take-up reel permitting the cable to follow conveyor accumulator movement; whereby, in operation, said conveyor means is stopped at said unloading stations and subsequently stacked articles are discharged from a plurality of generally vertically stacked platters at said unloading station by horizontal movement of said discharging rod from the engaging position to the discharging positions.

26. An endless conveyor means having a loading station and an unloading station, where said conveyor means has a generally vertical discharge run, said conveyor means including a conveyor accumulator having a series of vertical runs to accommodate variations in conveyor movement during loading and unloading; a plurality of article carrying platters operatively connected to, and extending outwardly of, said conveyor means, each platter co-operating with the next adjacent platter to provide an article receiving pocket means therebetween, a plurality of outwardly open slots in each of said platters, each slot having an inner end, said slots extending longitudinally in each of said platters outwardly of said conveyor means, the slots in one platter being aligned with the slots in the next adjacent platter; and a plurality of generally horizontally reciprocal upstanding article discharging rods at said unloading station, each of said rods being positioned in alignment with a slot of said plurality of slots in each of said platters and movable generally horizontally from an engaging position where the rods are at the inner end of the slots of said plurality of slots and a discharge position; a vertically extending conveyor restraining means extending along at least a portion of said vertical runs to maintain articles on said platter during conveyor movement, wherein said conveyor restraining means include an article restraining cable having an inertia take-up reel permitting the cable to follow conveyor accumulator movement; whereby, in operation, said conveyor means is stopped at said unloading station and subsequently stacked articles are discharged from a plurality of vertically stacked platters at said unloading station by horizontal movement of said discharging rod from the engaging position to the discharging position.

* * * * *